United States Patent

Mayerle et al.

[19]

[11] Patent Number: 6,068,063

[45] Date of Patent: May 30, 2000

[54] HYDRAULIC CONNECTION CIRCUIT BETWEEN FIRST AND ACTIVE HYDRAULIC CIRCUITS

[75] Inventors: Dean J. Mayerle; David R. Hundeby, both of Saskatoon, Canada

[73] Assignee: Flexi-Coil Ltd., Saskatoon, Canada

[21] Appl. No.: 09/257,516

[22] Filed: Feb. 25, 1999

Related U.S. Application Data

[60] Provisional application No. 60/076,208, Feb. 27, 1998.

[51] Int. Cl.[7] .................................................. A01B 63/14
[52] U.S. Cl. .......................... 172/315; 172/663; 280/421; 111/200
[58] Field of Search ..................................... 111/200, 174, 111/175, 179, 185; 172/7, 8, 311, 470, 663, 324, 315, 407, 239, 260.5; 180/53.4, 14.1, 14.3, 14.4; 56/DIG. 11; 280/420, 421; 60/421, 420, 429

[56] References Cited

U.S. PATENT DOCUMENTS

| | | | |
|---|---|---|---|
| 3,293,942 | 12/1966 | Stein et al. | 74/664 |
| 4,046,399 | 9/1977 | Zeuner et al. | 280/420 |
| 4,092,999 | 6/1978 | Rubrich | 137/504 |
| 4,517,800 | 5/1985 | Karakama et al. | 60/421 |
| 4,715,302 | 12/1987 | Briggs | 111/1 |
| 5,133,174 | 7/1992 | Parsons, Jr. | 56/DIG. 11 |
| 5,687,798 | 11/1997 | Henry et al. | 172/311 |
| 5,713,192 | 2/1998 | Robinson | 56/DIG. 11 |
| 5,875,630 | 3/1999 | Walsh et al. | 60/421 |
| 5,957,475 | 9/1999 | Pearen et al. | 280/421 |
| 5,964,078 | 10/1999 | Robinson | 56/DIG. 11 |

FOREIGN PATENT DOCUMENTS

| | | | |
|---|---|---|---|
| 1096685 | 3/1981 | Canada | 172/260.5 |
| 0661164 | 5/1979 | U.S.S.R. | 60/420 |
| 2251961 | 7/1992 | United Kingdom | 60/421 |

*Primary Examiner*—Thomas B. Will
*Assistant Examiner*—Nathan Mammen
*Attorney, Agent, or Firm*—J. William Stader; Larry W. Miller; Frank A. Seemar

[57] ABSTRACT

A connection circuit for connecting a first and an active hydraulic circuit. The first circuit is a fan or motor on an air cart which uses a fixed amount of volume. The active circuit is for applying a down pressure on a pulled, ground—working implement. The connection circuit also has a valve for switching the flow to the active circuit from the first circuit to the tractor hydraulics. In an alternative embodiment, there is an orifice and check valve or pressure relief valve for preventing the active circuit from withdrawing an excess amount of hydraulic flow from the first circuit.

16 Claims, 3 Drawing Sheets

HYDRAULIC CONNECTION CIRCUIT BETWEEN FIRST AND ACTIVE HYDRAULIC CIRCUITS

CROSS-REFERENCE TO RELATED APPLICATIONS

This application claims domestic priority on U.S. Provisional Patent Application Ser. No. 60/076,208, filed on Feb. 27, 1998.

BACKGROUND OF INVENTION

1. Field of Art

This invention relates to the improvement of a hydraulic circuit. More specifically it relates to an improvement in connecting a first circuit and an active hydraulic circuit. This has common applications with an agricultural tractor pulling an air cart and a tillage implement having an active circuit. The first hydraulic circuit in the air cart is connected to the active hydraulic circuit in the tillage implement. The first circuit could be a circuit operated by a fixed displacement pump.

2. Description of Prior Art

Various hydraulic circuits are used in agricultural implements in which actuators are operated as compressible links, like springs, but with a constant force through their range of motion. A circuit in which an actuator acts as a compressible link requires the actuator be in continuous connection with a source of controlled fluid pressure, and may be referred to as an active circuit, or the actuator as an active actuator. Pressure for the circuit may be stored in an accumulator, but it is often desirable to have a pump provide the pressure, eliminating the need for an accumulator. The purpose of the active actuator may be to provide a bias force between pivotal parts of an implement. The active circuit requires flow as actuators move in response to the implement's motion such as when the implement passes over uneven ground. Much of the time the circuit may require little or no flow. U.S. Pat. No. 5,687,798 illustrates a down-pressure system for agricultural implements. As seen in FIG. 6 of this patent, the active circuit is a toolbar that is pulled by an agricultural tractor. The wings of the toolbar may be raised upwards or downward to align with the slight variations in topography.

Variable displacement hydraulic pumps used on modern agricultural tractors have means to vary the pumped volume based on sensed pressure, and by sensing flow requirements. A variable displacement pump automatically adjusts to meet flow requirements thus these systems are reasonably efficient in connection with active circuits that have varying flow demands.

Older tractors have hydraulic pumps that deliver a fixed volume of flow at all times. Tractors with these pumps have operator control valves that allow the flow to go to the reservoir at near zero pressure when it is not directed to a connected circuit, and these are sometimes called "open-center systems".

If flow from an open-center system is directed to an active circuit, only a fraction of the total flow may be required most times, and flow volume not required within the circuit must be allowed back to the reservoir. Typically active circuits intended for connection with open center systems have included a relief valve to regulate the pressure in the circuit, controlling the force of the actuators and allowing any excess flow to return to the reservoir. Circuit connections of these types have various problems and inefficiencies.

One problem has been that the relief setting that may be desirable for controlling the active circuit limits the circuit pressure that is available to other branches. Often other branch circuits are required on the same or attached implements for operating wing lifts, augers, and various other hydraulic loads that may require more pressure.

Another problem is that the fixed volume pump must provide its flow at a pressure at least as much as the relief setting. When the active circuit requires little flow, the fluid power is relieved back to the reservoir that is an inefficient loss of power and generates much heat.

These problems have almost been forgotten because many tractors used today are equipped with variable volume pumps. However, tractors having fixed volume pumps are still in use and fixed volume pumps are also used to operate implement circuits independently of the tractor pump.

Another difficulty with current hydraulic systems is that the numbers of circuits and volume of fluid power required by some implements is more than is available on some tractors.

Another problem of prior circuit combinations is that sudden movements of actuators in active circuits demand much of the flow capacity of the pump system. This may starve other circuits connected with the same pump system of fluid flow or pressure, however those circuits may require minimum or steady flow or pressure in order to operate properly. This may occur even with more modem systems that have only pressure sensing variable flow pumps without volume sensing control.

A solution for connecting active circuits to open center systems that avoid inefficiency and other problems presented above is still needed.

OBJECTS OF THE INVENTION

It is an object of the present invention to provide a hydraulic connection circuit between a first hydraulic circuit on an air cart and an active circuit on a tillage implement, so the down pressure mode in the active circuit may be operated by a pressure source other than the tractor hydraulic system.

It an object of the present invention to provide a hydraulic connection circuit having a valve which permits the active circuit to receive hydraulic fluid directly from the tractor hydraulics as opposed to the first hydraulic circuit, for wing lift mode.

It is an object of the present invention to provide a hydraulic connection circuit having a alternate embodiment having the means for restricting the flow of hydraulic fluid from the first hydraulic circuit to the active circuit.

SUMMARY OF THE INVENTION

The invention is a means to connect an active hydraulic circuit of an agricultural implement to a fixed volume hydraulic system (one having a fixed displacement pump), referred to as a first system, in which the invention provides improved efficiency of operation. The invention also has advantageous application to connecting active circuits with variable volume systems in some circumstances. The invention comprises a first circuit having a fixed volume and a second circuit that is an active circuit. A fixed volume PTO driven pump means drives the first circuit. A connection circuit for switching the active circuit to communicate with the air cart circuit allows for pressure from the PTO air cart circuit to maintain the active circuit during down pressure mode. Only a small amount of excess hydraulic fluid is required in the operation of the active circuit. The connection circuit also contains a valve for connecting the first circuit to the active circuit or the tractor hydraulics directly to the active circuit. A second embodiment allows for a restrictor means to be placed in the connection circuit. The restrictor means can consist of an orifice. The restrictor means prevents the active circuit from receiving excessive amounts of hydraulic fluid.

BRIEF DESCRIPTION OF DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
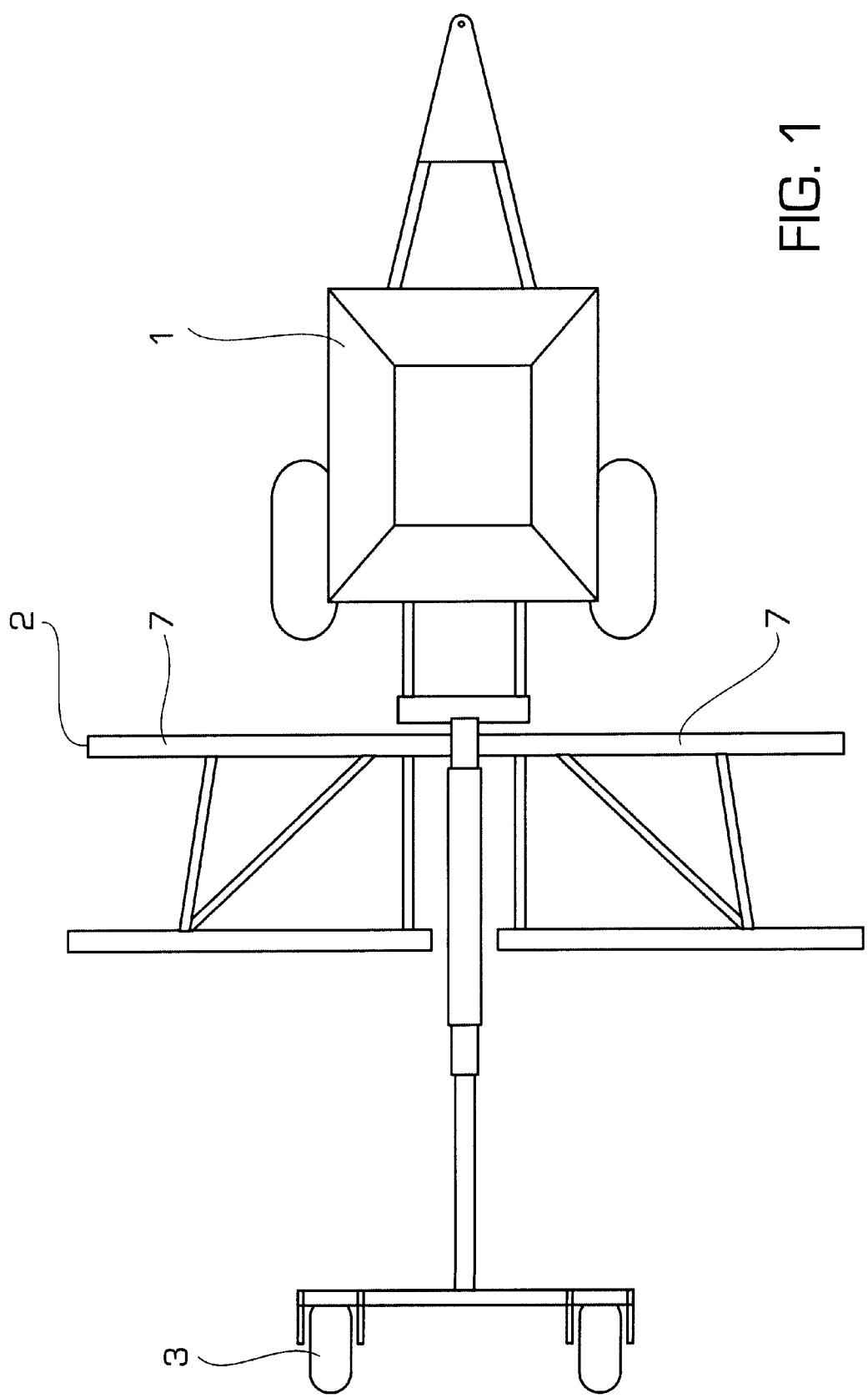
FIG. 1 shows an overhead view of the air cart and tillage implement.

Referring to the drawings, it is possible to observe the major elements and general operation of the present invention. Left and right references are used as a matter of convenience and are determined by standing at the rear of the towed ground working implement and facing the forward end in the normal direction of travel. Likewise, forward and rearward are determined by normal direction of travel of the implement. Upward or downward orientations are relative to the ground or operating surface. Horizontal or vertical planes are also relative to ground.

As seen in FIG. 1, the invention is located on the air cart 1 and tillage implement 2 that are pulled by an agricultural tractor (not shown). Such an arrangement is well known in the art. The ground working or tillage implement 2 has a pair of wings 7 and is partially support by a pair of rear wheels 3. The air cart 1 is support by a pair of wheels. A tractor pulls the air cart 1 and the air cart 1 pulls the tillage implement 2.

Figure 2:
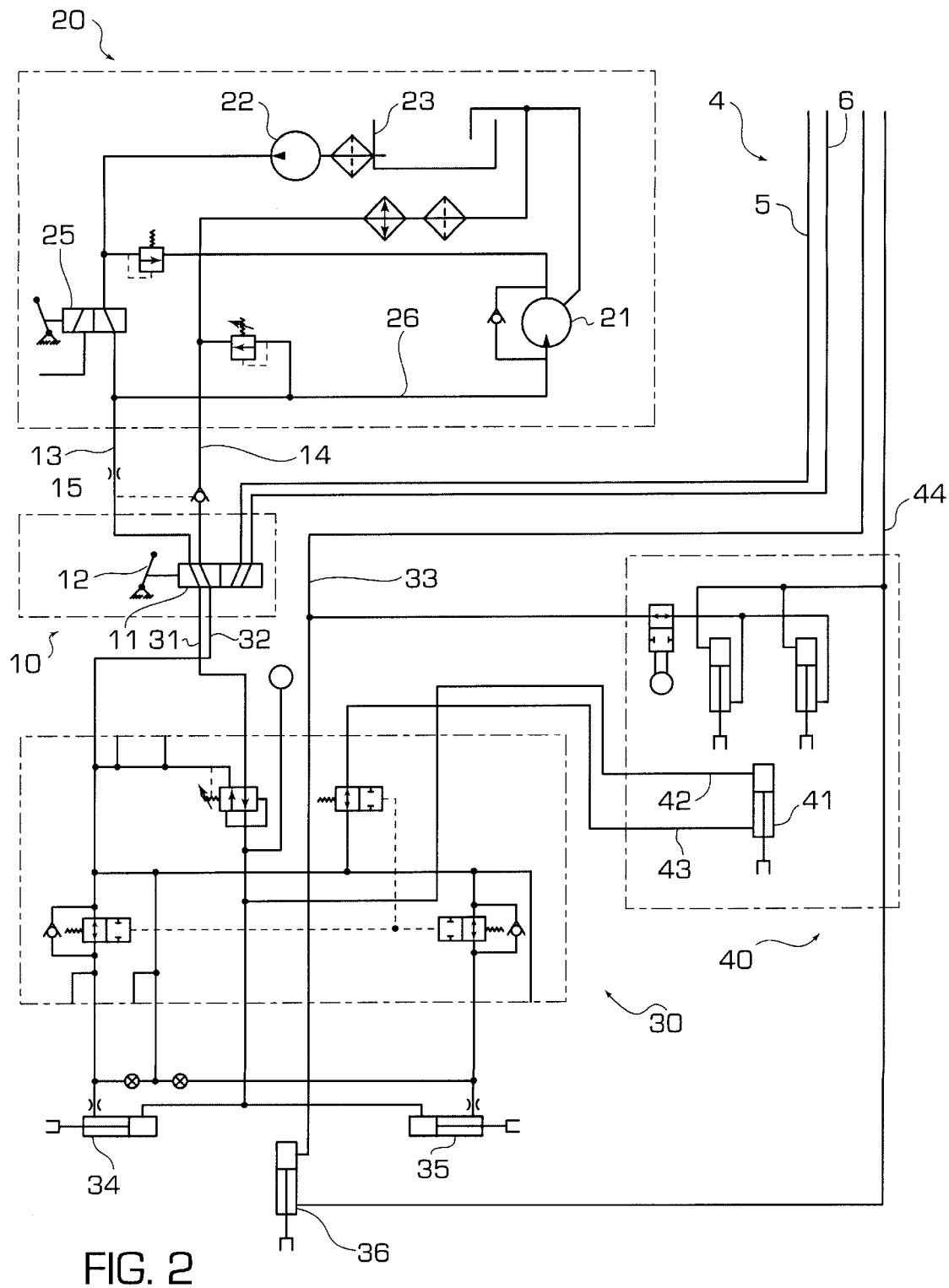
FIG. 2 shows hydraulic schematic illustrating the air cart, connection and down pressure circuits.

In this invention an aircart 1 is operated by a fixed volume system having a power-takeoff (PTO) driven fixed volume pump 22 (also referred to as the first circuit 20) as illustrated in FIG. 2. This circuit design is well known in the art. While Applicant uses the term first circuit to describe the air cart hydraulic circuit 20, it should be understood that a variety of hydraulic circuits could be used as the first circuit 20. The circuit 20 could be flow from a tractor or dedicated PTO pump, or a dedicated fan belt driven pump on the tractor. The circuit could also be a branch from another circuit. A first hydraulic fluid flow is used to operate the aircraft fan 21 and other hydraulic elements. Fan speed is controlled by a pressure regulator in the first circuit 20 which bypasses some hydraulic flow back to the reservoir 23 so that a particular hydraulic pressure is maintained to the fan, thereby maintaining a steady set fan speed. The pressure regulator is adjusted as necessary to set or change the fan speed. The pump 22 in the system is of a size to provide at least as much flow as required at maximum fan speed. Generally the pump 22 is somewhat oversized. Therefor there is generally always an excess of flow that is bypassed by the pressure regulator to maintain fan speed. There is also a switch-actuated valve 25 that can divert the first hydraulic fluid flow to an auger.

A hydraulic circuit of the tillage implement (referred to as the active or down pressure circuit 30) is an active circuit in which actuators require continuous hydraulic pressure to transmit force between machine elements in an active hydraulic downpressure arrangement. The down pressure circuit is the subject of U.S. Pat. No. 5,687,798. A small volume of hydraulic flow is required only when the actuators extend or retract when there is motion of the operated machine elements, otherwise pressure maintains the machine elements position and there is little or no motion, therefor no flow is required, only pressure. Sometimes the operated machine elements may make sudden large movements that demand surges of short periods but fast flow rates. The down pressure circuit 30 primarily controls the movement of the first wing lift cylinder 34, second wing lift cylinder 35 and top link cylinder 41.

There is also a three point hitch circuit 40 which is the subject of U.S. Ser. No. 08/891,204. This circuit 40 contains a top link 41 that receives hydraulic fluid flow from the base supply line 42 and rod supply line 43.

Besides the PTO driven pump 22, there are at least two additional sources of hydraulic fluid flow from the agricultural tractor. Such sources are common features on conventional tractors. For examples of tractor sources of hydraulic fluid flow please see the New Holland GENESIS™ tractor. In this instance, there are two pairs of hydraulic lines from a tractor hydraulic means. A second hydraulic fluid flow is provided from the tractor hydraulic means by a first tractor line 5 and the flow is returned to the tractor hydraulic means by a second tractor line 6. The tractor hydraulic means also provides fluid flow to the three point hitch circuit 40 and rear ground wheel cylinder 36 via the third tractor line 33 and fourth tractor line 44.

Figure 3:
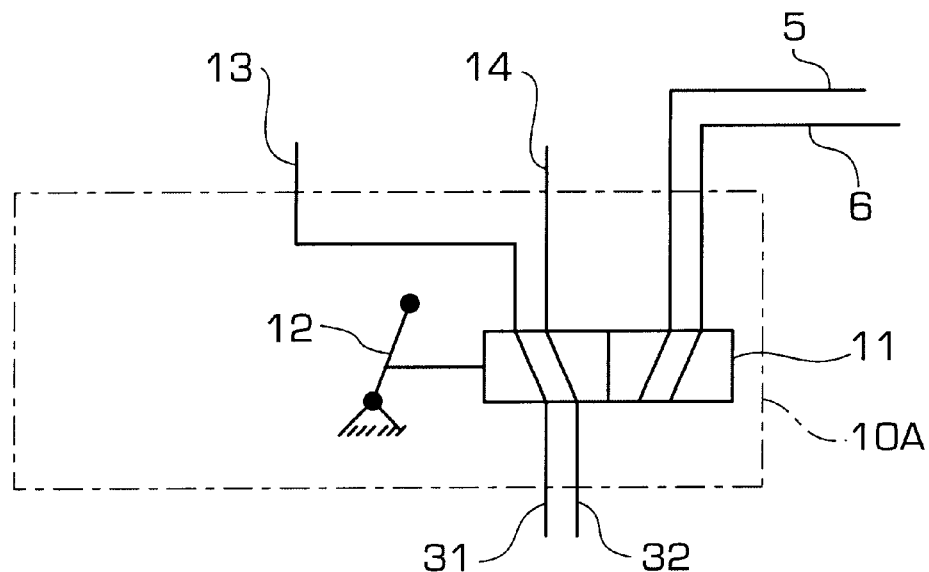
FIG. 3 shows a hydraulic schematic of an embodiment of the connection circuit.

Connecting the first circuit 20 and down pressure circuit 30 is the connection circuit 10. The connection circuit 10 has a two position valve 11 controlled by a switch 12. The switch may be manually or automatically actuated. When the two position valve 11 is in the first position (as seen in FIG. 2) the first hydraulic fluid flow passes through the first pressure line 13, through the valve 11 and into the first active line 31. The first active line 31 provides fluid flow in the down pressure circuit 30. The first fluid flow is returned to the first circuit through the second active line 32 through the valve 11 and into the second pressure line 14. When the switch moves the valve 11 to the second position (to the right as viewed in FIG. 2), the down pressure circuit 30 receives a second hydraulic fluid flow from the tractor hydraulic means. In this scenario, first tractor line 5 provides the second hydraulic fluid flow to the switch 11, the second flow than connects with the first active circuit. The second flow then returns to the second active line 32, through the valve 11 and to the second tractor line 6. The preferred embodiment of the connection circuit 10A is illustrated in FIG. 3. The connection circuits illustrated in FIGS. 2 and 4 show secondary embodiments.

As may be seen in FIG. 2, the secondary embodiment 10 has an orifice 15 or similar restriction on the first pressure line 13. The flow restriction limits the rate of flow from the first circuit 20 to the active circuit 30, so that the if a sudden demand occurs in the active circuit 30 happens, the first circuit still has sufficient hydraulic fluid flow to ensure that the air cart fan motor 21 can continue to operate. In the embodiment seen in FIG. 3, the amount of the first hydraulic fluid flow cannot exceed 3 gallons per minute.

Figure 4:
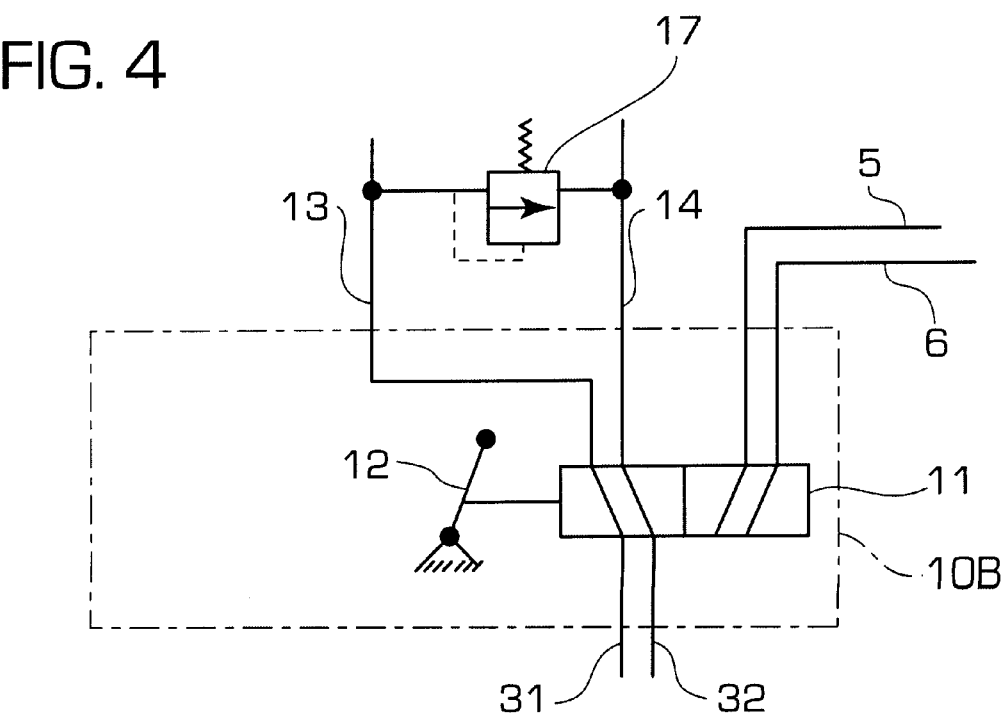
FIG. 4 shows a hydraulic schematic of an embodiment of the connection circuit.

Similarly, the secondary embodiment seen in FIG. 4 of the connection circuit 1 OB uses a pressure relief valve 17 connecting the first pressure line 13 and second pressure line 14. The pressure relief valve 17 actuates and bypasses the down pressure circuit when the first fluid flow pressure exceeds 1200 psi. It should be noted that the pressure to activate the pressure relief valve can be altered depending on the application and circumstances of use. When the pressure relief valve is actuated, the first fluid flow is immediately diverted from the first pressure line 13 to the second pressure line 14.

The advantages to the invention is that the excess flow from the fixed pump 22 is put to useful application rather than being relieved back to the reservoir which would be lost power. It also avoids the requirement for continuous operation of the tractor pump system for providing continuous pressure to the active circuit. This eliminates power losses that would otherwise exist in that system. Furthermore is solves the problem of lost power with tractors having CCLS systems that continually try to deliver at least a minimum flow to a circuit that may not accept any flow much of the time.

The invention is not limited to connecting only an active circuit with an aircart circuit being operated by a fixed volume PTO driven pump. The invention may also be used to connect other active circuit with other fixed volume systems as especially seen in the embodiment illustrated by FIG. 4.

The invention also provides advantage in minimizing power loses that can exist when connecting active circuits to variable volume hydraulic systems. Variable volume hydraulic systems are such that the volume delivered is varied proportionally with delivered pressure, so that when a maximum system pressure is reached, the delivered volume is reduced to zero. This was an improvement over fixed volume systems which was made available on tractors in about late 1960's. Variable volume systems are more efficient when operating with active hydraulic circuits because the circuit can be designed so that when the pressure is satisfied, the pumped volume is zero, and the power losses are minimized. However, volume capacity at high pressure is reduced due to the pressure compensation control and may now not be enough to meet demand of other connected circuits. A further improvement to hydraulic systems was a load sensing ability available on tractors since about early 1980's. Control means are provided to set flow rates for multiple circuit controls provided by the tractor. The pump will attempt to operate at a pressure just enough so that flow to any of the several operating circuits is no less than the set flow. If an active circuit is connected to the tractor directly, the tractor tries to maintain flow to the circuit, even though it may not accept any flow much of the time. In doing so, the tractor pump pressure is increased to it's maximum leading to a number of problems. Primarily, efficiency is lost due to the pressure delivered to the several circuits that may be connected is likely much more than required.

It will be obvious to those skilled in the art that various changes may be made without departing from the scope of the invention and the invention is not to be considered limited to what illustrated in the drawings and described in the specification.

What is claimed is:

1. In a hydraulic system for an agricultural tractor having a tractor hydraulic means, with a towed implement and a towed air cart comprising a first circuit positioned on the air cart and an active circuit positioned on the towed implement, the improvement comprising a connection circuit connecting the active circuit to the first circuit wherein the connection circuit further comprises a valve for selecting a hydraulic flow from first circuit and the tractor hydraulic means to the active circuit.

2. The improvement described in claim 1, wherein the connection circuit further comprises a first pressure line for receiving a flow of hydraulic fluid from the first circuit and a second pressure line for returning a flow of hydraulic fluid to the first circuit.

3. The improvement described in claim 2, wherein the first pressure line has an orifice.

4. The improvement described in claim 3, wherein the second pressure line has a check valve.

5. The improvement described in claim 2, wherein there is a pressure relief valve connected between the first pressure line and second pressure line.

6. A hydraulic system comprising:
   a. an active circuit;
   b. a first circuit; and
   c. a connection circuit having a first pressure line for receiving a first hydraulic fluid flow from the first circuit a second pressure line for returning the first hydraulic fluid flow to the first circuit, a first active line for providing the first hydraulic fluid flow to the active circuit and a second active line for receiving the first hydraulic flow from the active circuit and an agricultural tractor having a tractor hydraulic means having a first tractor line for providing a second hydraulic fluid flow and a second tractor line returning the second hydraulic fluid flow, wherein the connection circuit further comprises a two position valve for wherein when said valve is in a first position the valve provides the first hydraulic flow to the first active line from the first pressure line and receives the first hydraulic flow from the second active line to the second pressure line and wherein said valve is in a second position the valve provides the second hydraulic flow to the first active circuit from the first tractor line and receives the second hydraulic flow from the second active line to the second tractor line.

7. The hydraulic system as described in claim 6, wherein the two position valve is controlled by a switch.

8. The hydraulic system as described in claim 7, wherein the connection circuit further comprises a check valve on the second pressure line and an orifice on the first pressure line.

9. The hydraulic system as described in claim 8, wherein the orifice on the first pressure line restricts the first hydraulic fluid flow through the first pressure line to less than 3 gallons per minute.

10. The hydraulic system as described in claim 7, wherein the connection circuit further comprises a pressure relief valve connected between the first pressure line and second pressure line.

11. The hydraulic system as described in claim 10, where in the pressure relief valve will connect the first pressure line and second pressure line at a pressure of 1200 psi.

12. The hydraulic system described in claim 11, wherein the active circuit is for controlling the down pressure on a ground working implement, said active circuit further comprising an actuator for lifting a rear ground wheel, said active circuit positioned on the towed ground working implement.

13. The hydraulic system described in claim 12, wherein the first circuit comprises an air cart having a fan motor.

14. In a hydraulic system for an agricultural tractor having an active circuit for controlling the down pressure on a ground working implement, a first circuit for an air cart having a fan motor said first circuit having a first hydraulic fluid flow and a tractor hydraulic means having a first tractor line for providing a second hydraulic fluid flow and a second tractor line for receiving the second hydraulic fluid flow, the improvement comprising:
   a. a connection circuit having a first pressure line for receiving the first hydraulic fluid flow from the first circuit, a second pressure line for returning the first hydraulic fluid flow to the first circuit, a first line for providing the first hydraulic fluid flow the active circuit and a second line for receiving the first hydraulic flow from the active circuit;

b. a two position valve for wherein when said valve is in a first position the valve provides the first hydraulic flow to the first active line from the first pressure line and receives the first hydraulic flow from the second active line to the second pressure line and wherein said valve is in a second position the valve provides the second hydraulic flow to the first active circuit from the first tractor line and receives the second hydraulic flow from the second active line to the second tractor line; and c. a switch for controlling the two position valve.

15. The improvement described in claim 14, wherein the connection circuit further comprises a check valve on the second pressure line and an orifice on the first pressure line, wherein the orifice on the first pressure line restricts the first hydraulic fluid flow through the first pressure line to less than 3 gallons per minute.

16. The improvement described in claim 14, wherein the connection circuit further comprises a pressure relief valve connected between the first pressure line and second pressure line, wherein the pressure relief valve will connect the first pressure line and second pressure line at a pressure of 1200 psi.

* * * * *